(12) United States Patent
Mundt et al.

(10) Patent No.: US 7,804,680 B2
(45) Date of Patent: Sep. 28, 2010

(54) SYSTEM AND METHOD FOR CONNECTING INFORMATION HANDLING SYSTEM WITH A UNIFIED KEYBOARD AND MOUSE CABLE

(75) Inventors: Kevin Mundt, Austin, TX (US); Ron Langerhans, Austin, TX (US); James R. Utz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1371 days.

(21) Appl. No.: 11/259,800

(22) Filed: Oct. 27, 2005

(65) Prior Publication Data

US 2007/0097079 A1 May 3, 2007

(51) Int. Cl.
G06F 1/16 (2006.01)

(52) U.S. Cl. .............. 361/679.18; 361/679.4; 174/117 F; 400/472; 400/691; 400/692

(58) Field of Classification Search ............. 361/679.18
See application file for complete search history.

(56) References Cited

U.S. PATENT DOCUMENTS

| | | | | |
|---|---|---|---|---|
| 3,633,189 | A * | 1/1972 | Billawala | 360/245.8 |
| 4,065,199 | A * | 12/1977 | Andre et al. | 439/498 |
| 4,145,584 | A * | 3/1979 | Otterlei | 200/5 A |
| 4,379,287 | A * | 4/1983 | Tyler et al. | 341/33 |
| 4,425,484 | A * | 1/1984 | Fukukura | 200/5 A |
| 4,460,804 | A * | 7/1984 | Svejkovsky | 174/117 A |
| 4,493,952 | A * | 1/1985 | Kaleida | 200/5 A |
| 4,524,249 | A * | 6/1985 | Farrell | 200/5 A |
| 4,543,544 | A * | 9/1985 | Ziegner | 333/34 |
| 5,119,048 | A * | 6/1992 | Grunwell | 333/34 |
| 5,130,499 | A * | 7/1992 | Dijkshoorn | 174/254 |
| 5,281,765 | A * | 1/1994 | Iura et al. | 174/117 F |
| 5,383,788 | A * | 1/1995 | Spencer | 439/67 |
| 5,489,900 | A * | 2/1996 | Cali et al. | 341/34 |
| 5,774,329 | A * | 6/1998 | Kuo | 361/679.17 |
| 5,895,889 | A * | 4/1999 | Uchida et al. | 174/72 A |
| 5,898,425 | A | 4/1999 | Sekine | 345/168 |
| 6,064,564 | A * | 5/2000 | Song et al. | 361/679.09 |
| 6,089,905 | A * | 7/2000 | Shimmyo et al. | 439/495 |
| 6,099,346 | A * | 8/2000 | Hashiguchi et al. | 439/495 |
| 6,104,604 | A * | 8/2000 | Anderson et al. | 361/679.55 |
| 6,194,664 | B1 * | 2/2001 | Zamora et al. | 174/117 F |
| 6,344,616 | B1 * | 2/2002 | Yokokawa | 174/117 F |
| 6,445,382 | B1 | 9/2002 | Poole et al. | 345/168 |
| 6,453,377 | B1 * | 9/2002 | Farnworth et al. | 710/300 |
| 6,454,585 | B1 * | 9/2002 | Homer et al. | 439/218 |

(Continued)

Primary Examiner—Jayprakash N Gandhi
Assistant Examiner—Anthony Q Edwards
(74) Attorney, Agent, or Firm—Hamilton & Terrile, LLP; Robert W. Holland

(57) ABSTRACT

A portable information handling system keyboard cable integrates keyboard and point stick conductors in a common membrane to communicate user inputs from a keyboard and point stick to processing components. The cable terminates at a motherboard end with a ZIF connector to connect with processing components at the motherboard and terminates at keyboard end with a connector for keyboard and point stick conductors. In one embodiment, the keyboard and point stick conductors terminate in a common connector having conductive pads arranged in a V shape to connect with conductors extending from a keyboard membrane. In alternative embodiments, the point stick conductors extend out from the common membrane to align with point stick conductors extending from a keyboard assembly.

17 Claims, 4 Drawing Sheets

U.S. PATENT DOCUMENTS

| | | | |
|---|---|---|---|
| 6,512,510 B1 | 1/2003 | Maeda ........................ | 345/168 |
| 6,575,411 B1 * | 6/2003 | Serizawa et al. .............. | 248/49 |
| 6,595,786 B2 * | 7/2003 | Horiuchi et al. ............... | 439/74 |
| 6,602,083 B2 * | 8/2003 | Tsunematsu ................. | 439/260 |
| 6,626,687 B2 * | 9/2003 | Homer et al. ................ | 439/151 |
| 6,626,690 B2 * | 9/2003 | Homer et al. ................ | 439/218 |
| 6,648,652 B2 * | 11/2003 | Nakano et al. ................ | 439/55 |
| 6,693,624 B1 * | 2/2004 | Niiyama ...................... | 345/161 |
| 6,766,577 B2 * | 7/2004 | Homer et al. ................. | 29/854 |
| 6,914,197 B2 * | 7/2005 | Doherty et al. ............. | 174/254 |
| 7,029,319 B2 * | 4/2006 | Kunishi ....................... | 439/492 |
| 7,175,472 B2 * | 2/2007 | Wu et al. .................... | 439/492 |
| 7,267,552 B2 * | 9/2007 | Lin et al. ..................... | 439/67 |
| 7,470,862 B2 * | 12/2008 | Lin et al. ................. | 174/117 R |
| 7,544,087 B2 * | 6/2009 | Homer et al. ............... | 439/492 |
| 7,641,610 B2 * | 1/2010 | Nakamura et al. .......... | 600/132 |
| 2001/0029128 A1 * | 10/2001 | Horiuchi et al. ............. | 439/578 |
| 2002/0084920 A1 * | 7/2002 | Olodort et al. ................ | 341/22 |
| 2003/0027434 A1 * | 2/2003 | Homer et al. ................ | 439/61 |
| 2008/0174951 A1 * | 7/2008 | Mundt et al. ................ | 361/686 |

* cited by examiner

US 7,804,680 B2

SYSTEM AND METHOD FOR CONNECTING INFORMATION HANDLING SYSTEM WITH A UNIFIED KEYBOARD AND MOUSE CABLE

BACKGROUND OF THE INVENTION

1. Field of the Invention

The present invention relates in general to the field of information handling system cable connections, and more particularly to a system and method for connecting an information handling system with a unified keyboard and point stick mouse cable.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a number of discrete processing components arranged in a housing, such as a CPU, RAM, hard disk drive, chipset, keyboard system and point stick mouse system. Generally these processing components are interfaced with conductors, such as buses formed in a printed circuit board. In some instances, cables extend between components or extend from a printed circuit board to a component, such as where the component lacks a socket to connect directly to the printed circuit board. An example of this for portable information handling systems is the connection of a keyboard through a flexible cable or flexible circuit to a motherboard for communication of user inputs to an embedded or keyboard controller. Typically a ZIF or other type of connector socket is built into the motherboard with conductive traces to connect to the embedded controller. A flexible cable extends from the keyboard membrane out to a ZIF connector with sufficient length so that the connector can be assembled into the socket with the keyboard distal the information handling system. Once the keyboard is electrically interfaced with the motherboard through the socket connection, then the keyboard itself is assembled to the information handling system housing, typically covering the processing components and motherboard. The flexible cable typically has conductive traces, such as silver or copper ink traces, embedded in a flexible membrane material.

One difficulty with building information handling systems is ensuring that all cable connections fit within the housing and connect with the correct components. This difficulty is particularly true with portable information handling systems since portable systems are generally built into relatively small housings. Extraneous or difficult to manage cable connections can significantly slow the process of building a system, thus increasing manufacture cost. As one example, some portable information handling systems incorporate a mouse point stick in the keyboard. Separate cables are typically used to connect the keyboard and the mouse pointer to the motherboard. For instance, the keyboard is built with a plastic membrane having conductive electrical traces to make a keyboard circuit matrix and having a tail that extends from the matrix to provide a connection of the matrix to the flexible cable. In contrast, the point stick is a separate assembly attached to the keyboard assembly and having an electrical connection separate from the keyboard membrane. The use of separate cables to connect the point stick and keyboard circuit matrix to the motherboard slows assembly of the information handling system by introducing plural assembly steps and by the awkward position of the multiple cables in the system housing.

SUMMARY OF THE INVENTION

Therefore a need has arisen for a system and method which communicates keyboard and mouse pointer stick signals to an information handling system over a unified cable.

In accordance with the present invention, a system and method are provided which substantially reduce the disadvantages and problems associated with previous methods and systems for communicating keyboard and mouse pointer stick signals to an information handling system. Keyboard and point stick mouse inputs are communicated from a keyboard assembly to processing components of an information handling system through a unified cable having keyboard and point stick conductors enclosed in a common membrane for at least a portion of the length of the cable.

More specifically, a portable information handling system integrates a keyboard assembly into a portable housing with a keyboard cable communicating user inputs from the keyboard assembly to processing components of the information handling system. The keyboard assembly includes keypads that stimulate electrical signals in a keyboard membrane and a point stick mouse that provides electrical signals of user inputs at connectors. The keyboard membrane forms a tail having connection pads formed in a V shape to connect with aligned keyboard cable connection pads. The keyboard cable aligns keyboard conductors to communicate keypad inputs from the membrane and aligns point stick conductors to communicate point stick inputs from the point stick mouse. The keyboard and point stick conductors of the cable are enclosed for at least a portion of the cable length in a unified membrane that terminates at a motherboard connector, such as a ZIF connector. In one embodiment, the point stick conductors are routed from the point stick mouse through the keyboard membrane to connection pads in the membrane tail portion so that a cable having conductors enclosed in a single membrane for its entire length connects with both keyboard conductor and point stick conductor connectors. In an alternative embodiment, the keyboard cable separates along its length from a single membrane to a keyboard membrane enclosing keyboard conductors and a point stick membrane enclosing point stick conductors. The keyboard conductor membrane positions the keyboard conductors at the keyboard membrane while the point stick conductor membrane extends to the point stick mouse to position the point stick conductors for coupling to the point stick connectors.

The present invention provides a number of important technical advantages. One example of an important technical advantage is that a unified cable communicates information from a keyboard assembly to an information handling system. The unified cable reduces the complexity of building the information handling system by having fewer components to assemble in the restricted space beneath the keyboard assembly and by reducing the risk of connecting unmatched components with incorrect cables.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A unified keyboard and point stick cable interfaces processing components of a portable information handling system keyboard and point stick user inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
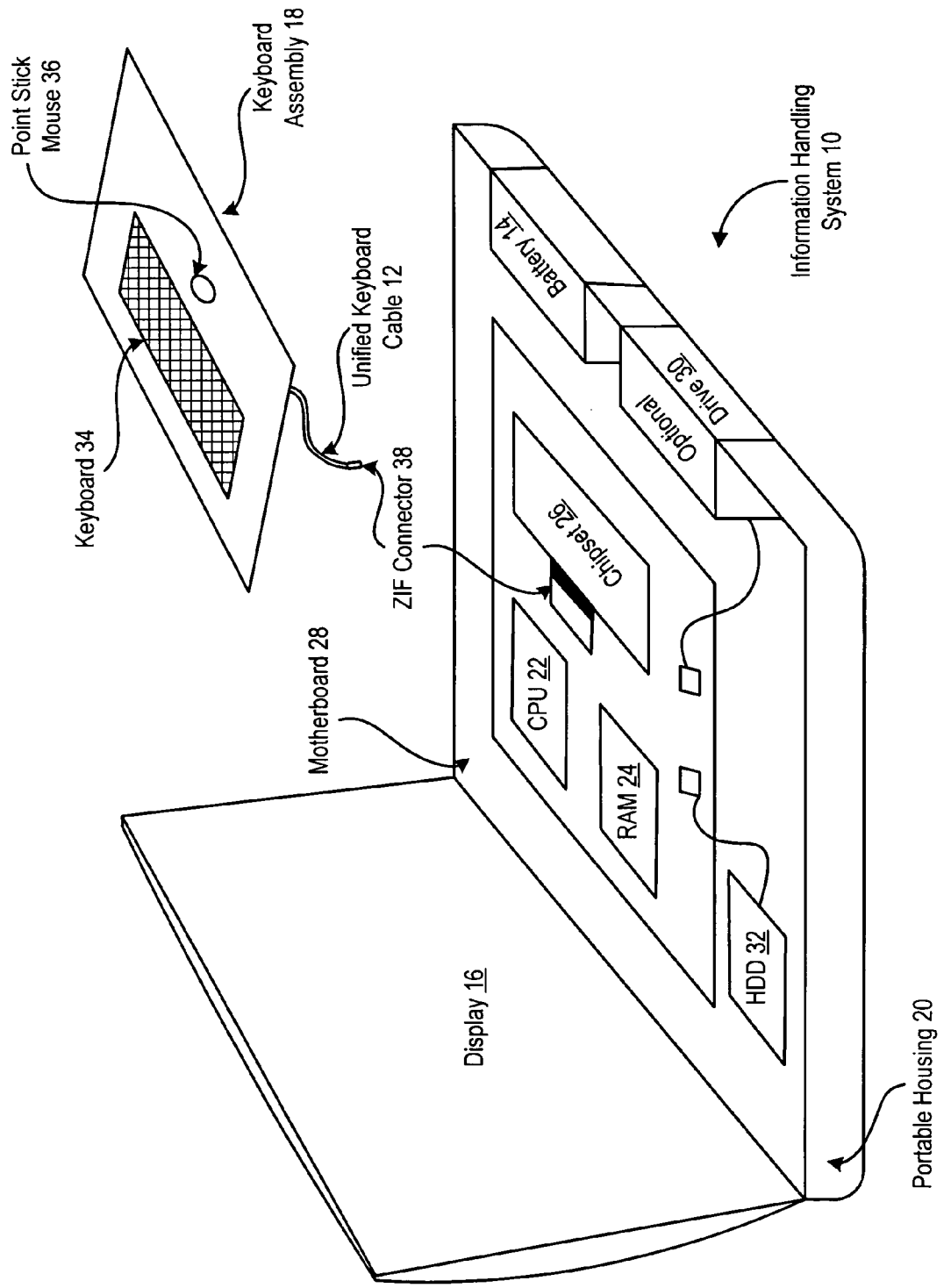
FIG. 1 depicts a block diagram of a portable information handling system having a unified keyboard and point stick cable.

Referring now to FIG. 1, a block diagram depicts a portable information handling system 10 having a unified keyboard and point stick cable 12. Portable information handling system 10 is built to run on a battery 14 independent of an external power source and includes a display 16 and keyboard assembly 18 integrated in a portable housing 20 to support mobile operations. Processing components are disposed in portable housing 20 to process information, such as a CPU 22, RAM 24 and chipset 26 built into a motherboard 28, and an optical drive 30 and hard disc drive 32 interfaced with other processing components through a cable connected with motherboard 28. Keyboard assembly 18 includes a keyboard 34 and point stick mouse 36 to accept user inputs, translate the user inputs into electrical signals, and communicate the electrical signals to the processing components. The user inputs are communicated from keyboard assembly 18 to processing components disposed in portable housing 20 through unified keyboard cable 12. Keyboard cable 12 terminates at a ZIF connector 38 which couples to an opposing ZIF connector 38 associated with chipset 26. User keyboard and point stick inputs are communicated through a single common cable for use by the processing components, such as through a keyboard controller of chipset 26.

Figure 2:
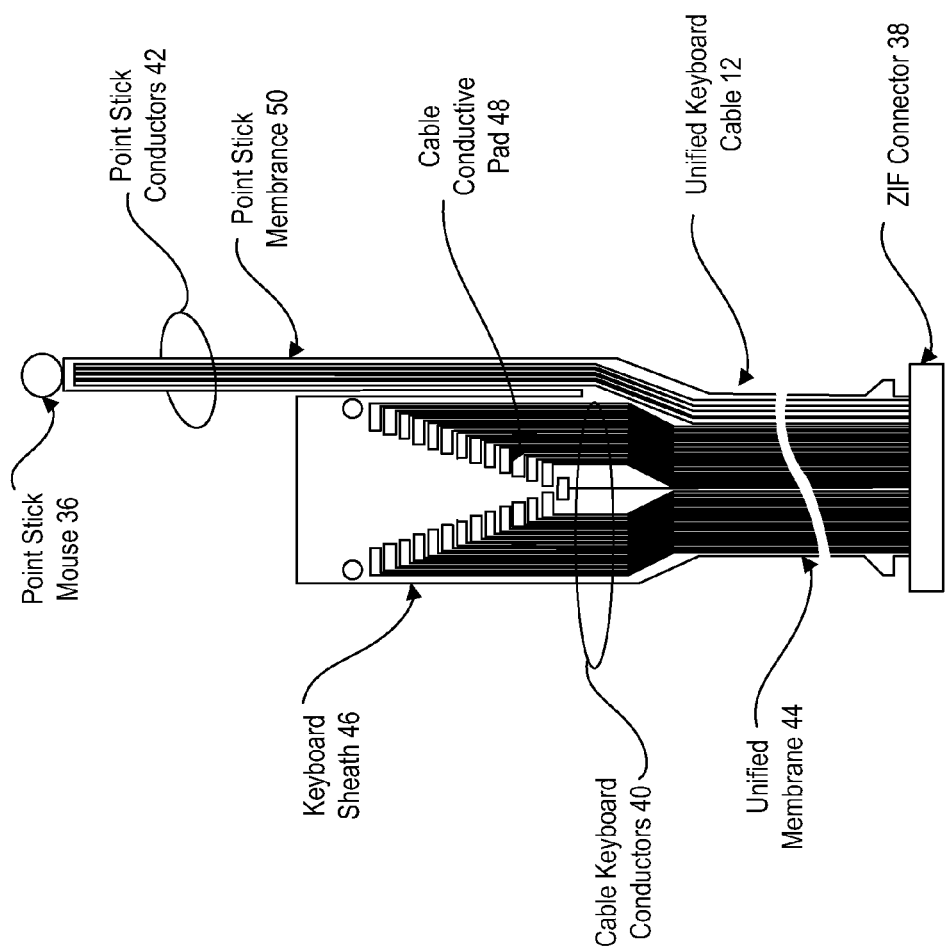
FIG. 2 depicts a keyboard cable having keyboard and point stick conductors unified in a common membrane for a portion of the cable length.

Referring now to FIG. 2, a unified keyboard cable 12 is depicted having keyboard conductors 40 and point stick conductors 42 unified in a common unified membrane 44 for at least a portion of the cable length. In the embodiment depicted by FIG. 2, keyboard conductors 40 extend to a keyboard membrane 46 and terminate at conductive pads 48 that are exposed to connect with conductors of keyboard 34 extending from keyboard assembly 18. Conductive pads 48 are arranged in a V shape to provide extra spacing for connecting to opposing conductive pads. Point stick conductors 42 extend to a point stick membrane 50 and terminate exposed for connection to point stick mouse 36 of keyboard assembly 18. Point stick conductors 42 and point stick membrane 50 extend to position the termination connections proximate the location of point stick mouse 36 once conductive pads 48 are connected. In alternative embodiments, point stick conductors 42 are enclosed in unified membrane 44 to terminate as conductive pads 48 proximate keyboard conductive pads. Membrane 44 is constructed of conventional insulating material that encloses both point stick and keyboard conductors for at least some length of cable 12.

Figure 3:
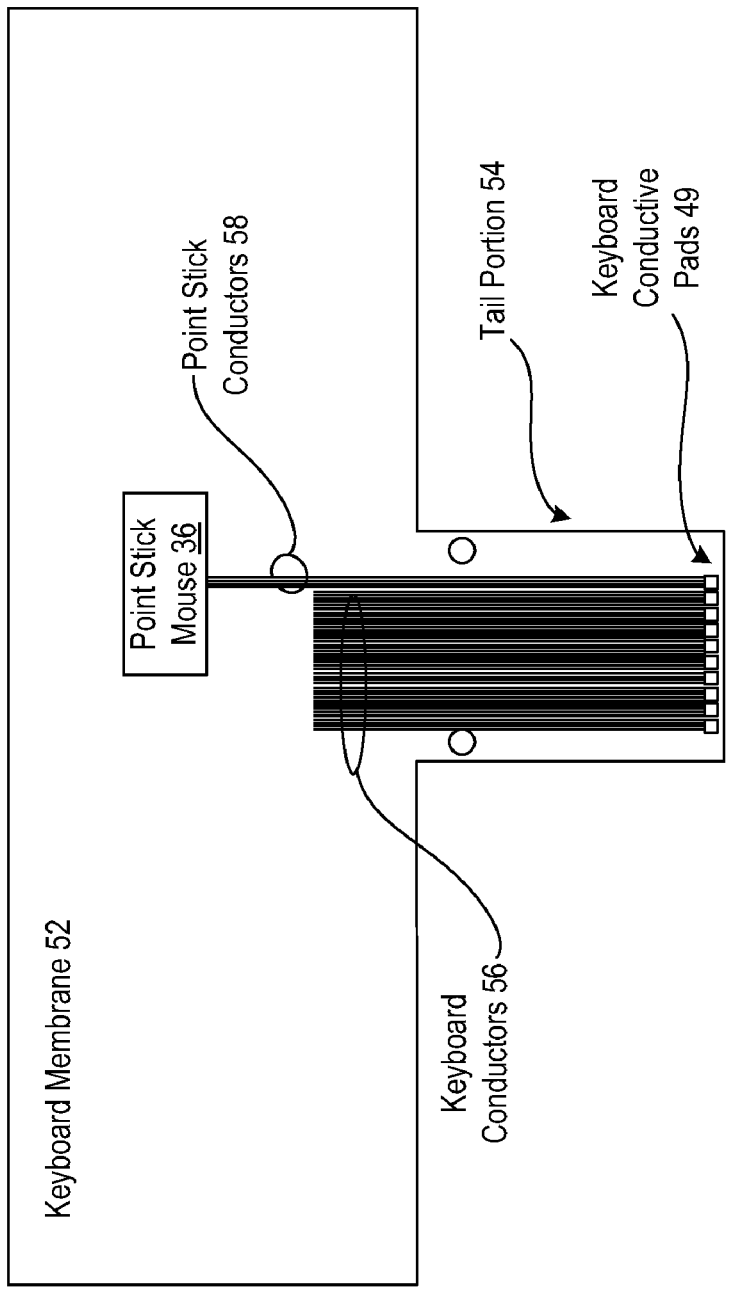
FIG. 3 depicts a keyboard membrane having conductive pads extending from a tail portion to connect keyboard and point stick conductors with the keyboard cable.

Referring now to FIG. 3, a keyboard membrane 52 is depicted having keyboard conductive pads 49 extending from a tail portion 54 to connect keyboard conductors 56 and point stick conductors 58 with the keyboard cable. Keyboard membrane 52 has keys distributed across its surface that create an electrical signal when pressed upon by a user. The keys of membrane 52 are electrically interfaced with keyboard conductors 56 and conductive pads 48 so that the signals are communicated to conductive pads 48. Point stick mouse 36 is electrically connected to point stick conductors 58 that transverse membrane 52 and communicate electrical signals input by users to keyboard conductive pads 49. In alternative embodiments, the electrical connectors for point stick mouse 36 are disposed at point stick mouse 36 so that the keyboard cable extends to the location of point stick mouse 36. Conductive pads 49 are aligned in a straight line, as opposed to the V shape depicted by FIG. 2, to reduce the size that tail portion 54 extends from membrane 52. The arrangement of conductive pads 49 may be varied to meet desired system constraints.

Figure 4:
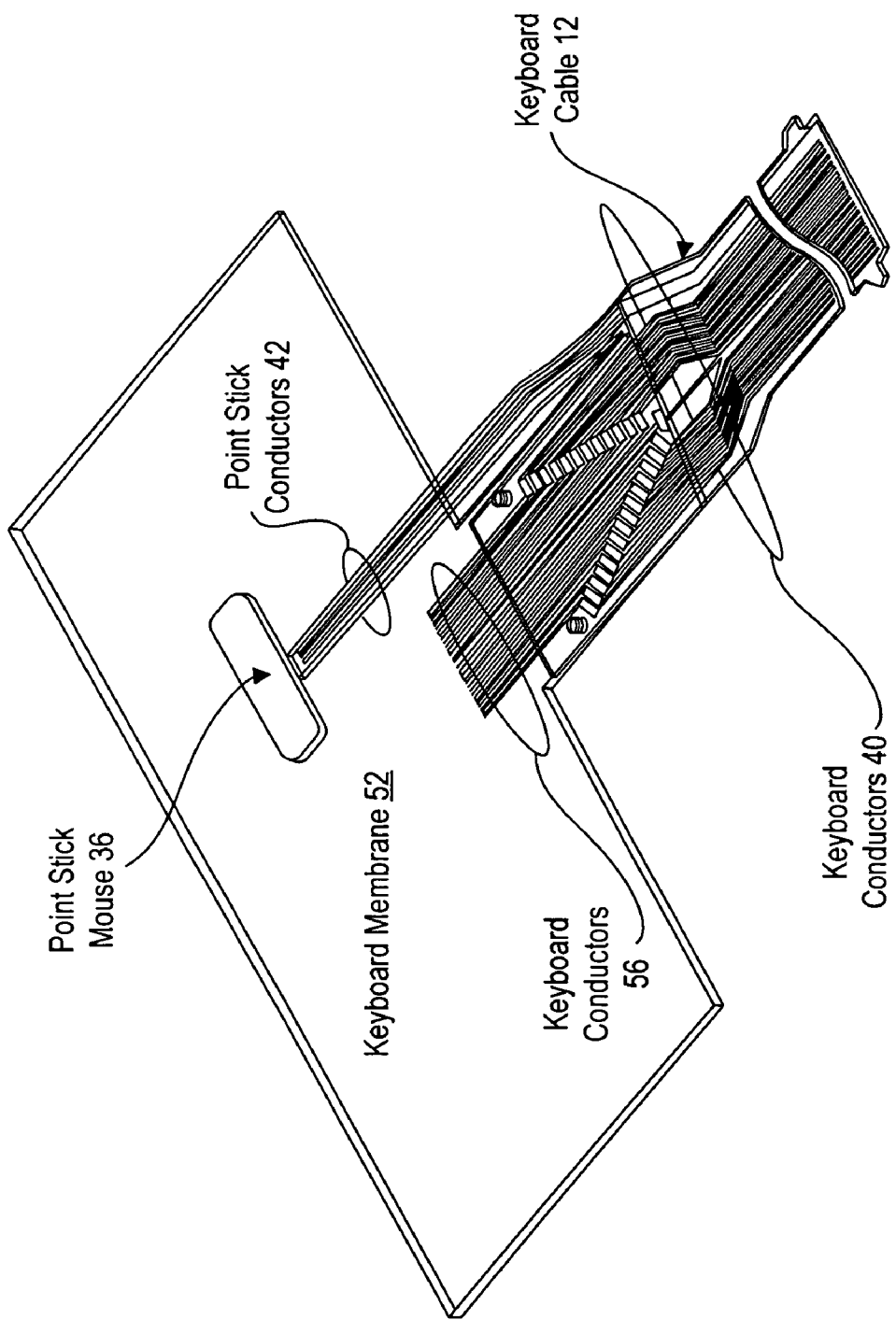
FIG. 4 depicts a keyboard membrane interfaced with the keyboard cable.

Referring now to FIG. 4, a keyboard membrane 52 is depicted interfaced with the keyboard cable 12. Conductive pads 48 of cable 12 and membrane 52 are aligned and bonded together to ensure communication of electrical signals from membrane 52 through cable 12. For instance, conductive pads 48 are connected with a conductive adhesive, such as a conductive epoxy, or with physical binding. Point stick conductors 42 of cable 12 extend to the position of point stick mouse 36 on membrane 52 to couple with connectors of point stick mouse 36. Keyboard cable 12 has keyboard conductors 40 and point stick conductors 42 integrated in a common membrane for at least a portion of the length of cable 12. In an embodiment having point stick conductors integrated in membrane 52 to tail portion 54, the membrane of keyboard cable 12 may enclose both keyboard conductors 40 and point stick conductors 42 for the entire length of cable 12.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a keyboard assembly operable to accept user inputs and translate the user inputs into electrical signals for communication to the processing components through a plurality of conductive pads;
   a point stick integrated into the keyboard assembly, the point stick operable to accept user inputs and translate the user inputs into electrical signals for communication to the processing components through a connector; and
   a cable having plural conductors enclosed at least in part with a single membrane, a first set of the conductors interfacing the keyboard assembly conductive pads to the processing components, the second set of conductors interfacing the point stick connector to the processing components, the first and second connectors disposed proximate to each other and having a V shape.

2. The information handling system of claim 1 further comprising:
   a cable ZIF connector terminating the first and second set of plural conductors of the cable; and
   a motherboard ZIF connector extending from the processing components to connect with the cable ZIF connector.

3. The information handling system of claim 1 wherein the keyboard assembly comprises a keyboard membrane having a tail, the tail having the conductive pads exposed to connect with the cable conductors.

4. The information handling system of claim 3 wherein the point stick connector comprises conductors extending through the membrane to conductive pads exposed in the tail to connect with the cable conductors.

5. The information handling system of claim 1 wherein the cable connects to the conductive pads with a conductive adhesive.

6. The information handling system of claim 1 wherein the cable connects to the conductive pads with a conductive epoxy.

7. The information handling system of claim 1 wherein the cable connects to the conductive pads with a physical binding.

8. A method for interfacing user inputs with information handling system processing components, the method comprising:
   disposing the processing components in a portable housing;
   exposing a connector in the portable housing, the connector interfaced with the processing components;
   connecting a first end of a cable to a keyboard assembly, the cable having a single membrane for at least part of a length, the keyboard assembly having keypad connectors and point stick connectors connected with the cable, the keypad connectors and point stick connectors disposed proximate to each other to form a V shape;
   connecting a second end of the cable to the connector in the portable housing; and
   assembling the keyboard assembly into the portable housing over the processing components.

9. The method of claim 8 wherein connecting a first end of a cable further comprises connecting a first portion of the cable to the keypad connectors and connecting a second portion of the cable to the point stick connectors, the first and second portions having separate membranes.

10. The method of claim 9 wherein connecting the first portion of the cable comprises connecting the cable to conductive pads formed from a keyboard membrane.

11. The method of claim 10 wherein connecting the second portion of the cable comprises connecting the cable to a point stick integrated in the keyboard membrane, the second portion of the cable having a length extending past the first portion of the cable to the point stick.

12. The method of claim 10 wherein connecting the second portion of the cable comprises running conductors from the point stick to the conductive pads, the second portion of the cable connecting to the conductors proximate the conductive pads.

13. The method of claim 8 wherein connecting a first end of a cable further comprises connecting a first portion of the cable to the keypad connectors and connecting a second portion of the cable to the point stick connectors, the first and second portions having a common single membrane.

14. The method of claim 8 wherein connecting a first end of a cable further comprises coupling the cable to keyboard membrane conductive pads with a conductive adhesive.

15. The method of claim 14 wherein connecting the second end of the cable further comprises connecting a ZIF connector at the second end of the cable to a ZIF connector at a motherboard disposed in the housing.

16. An information handling system keyboard cable comprising:
   a set of keyboard conductors having a first end terminating at a motherboard connector and a second end terminating at a keyboard connector;
   a set of point stick conductors having a first end terminating at the motherboard connector and a second end terminating at a point stick connector; and
   a sheath enclosing the keyboard conductors together with at least a portion of the point stick conductors;
   wherein the keyboard connector comprises plural conductive pads interfaced with the keyboard conductors and formed in a V shape;
   wherein the point stick connector comprises plural conductive pads interfaced with the point stick conductors proximate the keyboard conductors at the V shape, the membrane enclosing both the keyboard conductors and the point stick conductors from motherboard connector to both the point stick connector and the keyboard connector.

17. The information handling system keyboard cable of claim 16 wherein the motherboard connector comprises a ZIF connector.

* * * * *